(12) United States Patent
Ealey

(10) Patent No.: US 7,188,964 B2
(45) Date of Patent: Mar. 13, 2007

(54) INTEGRATED ACTUATOR MENISCUS MIRROR

(75) Inventor: Mark A. Ealey, Littleton, MA (US)

(73) Assignee: Xinetics, Inc., Devens, MA (US)

(*) Notice: Subject to any disclaimer, the term of this patent is extended or adjusted under 35 U.S.C. 154(b) by 0 days.

(21) Appl. No.: 10/730,412

(22) Filed: Dec. 8, 2003

(65) Prior Publication Data

US 2004/0165289 A1 Aug. 26, 2004

Related U.S. Application Data

(60) Provisional application No. 60/450,198, filed on Feb. 25, 2003.

(51) Int. Cl.
*G02B 5/08* (2006.01)
*G02B 7/183* (2006.01)
*G02B 7/185* (2006.01)

(52) U.S. Cl. .................. 359/849; 359/846

(58) Field of Classification Search ........... 359/845, 359/846, 848, 849, 871
See application file for complete search history.

(56) References Cited

U.S. PATENT DOCUMENTS

| | | | | |
|---|---|---|---|---|
| 3,742,234 A | * | 6/1973 | Laakmann | 250/235 |
| 3,912,380 A | | 10/1975 | Klein | |
| 4,066,343 A | * | 1/1978 | Scott | 359/849 |
| 4,091,274 A | | 5/1978 | Angelback et al. | |
| 4,124,277 A | | 11/1978 | Stang | |
| 4,226,507 A | * | 10/1980 | Fuschetto | 359/849 |
| 4,331,383 A | | 5/1982 | Christiansen | |
| 4,444,467 A | * | 4/1984 | Shuskus et al. | 359/846 |
| 4,601,553 A | | 7/1986 | Pepi et al. | |
| 4,601,554 A | | 7/1986 | Plante et al. | |
| 4,606,960 A | | 8/1986 | Angel et al. | |
| 4,657,358 A | * | 4/1987 | Anthony et al. | 359/845 |
| 4,674,848 A | * | 6/1987 | Aldrich et al. | 359/845 |
| 4,725,144 A | * | 2/1988 | Nelson et al. | 356/513 |
| 4,781,870 A | | 11/1988 | Talbert | |
| 4,875,764 A | | 10/1989 | Marino et al. | |
| 4,898,604 A | | 2/1990 | Sauerwein | |
| 4,932,768 A | | 6/1990 | Gobeli | |
| 5,028,469 A | | 7/1991 | Costard | |
| 5,074,654 A | * | 12/1991 | Alden et al. | 359/849 |
| 5,076,700 A | | 12/1991 | DeCaprio | |
| 5,214,529 A | | 5/1993 | Marino et al. | |
| 5,365,379 A | * | 11/1994 | Sawicki | 359/846 |
| 5,734,516 A | | 3/1998 | Sayede | |
| 5,831,780 A | | 11/1998 | Krim | |
| 6,236,490 B1 | * | 5/2001 | Shen | 359/247 |

FOREIGN PATENT DOCUMENTS

DE 19917519 * 11/2000

* cited by examiner

*Primary Examiner*—Ricky D. Shafer
(74) *Attorney, Agent, or Firm*—Iandiorio & Teska

(57) ABSTRACT

An integrated actuator meniscus mirror includes an optical substrate having a mirror surface on one side and a support structure on the other and a plurality of actuators embedded in the support structure, spaced from and generally parallel to the mirror surface for applying bending moments to the mirror surface for controllably altering the shape of the mirror surface.

14 Claims, 8 Drawing Sheets

INTEGRATED ACTUATOR MENISCUS MIRROR

RELATED APPLICATIONS

This application claims the benefit of U.S. Provisional Patent Application No. 60/450,198 filed Feb. 25, 2003, entitled "AN INTEGRATED ACTUATOR MENISCUS MIRROR".

FIELD OF THE INVENTION

This invention relates to an integrated actuator meniscus mirror.

BACKGROUND OF THE INVENTION

Meniscus mirrors typically employ an optical substrate containing the mirror surface, a reaction mass, and a number of actuators for altering the shape of the mirror to a desired excursion (global or radius of curvature shaping of the entire mirror) or to effect correctability (local altering of the shape to overcome distortion) from e.g., heat, vibration, gravity. The mirrors may be operated zonally; each zone of the mirror has a local sensor which controls a local actuator to shape that area of the mirror or modally: the entire mirror surface is sensed globally (e.g. using an interference pattern) and then the local actuators are operated to effect the sloping. The actuators are generally oriented normal to the mirror surface and require the reaction mass to exert the proper deformation to the mirror to overcome the distortion. One problem has been that the need to lighten the weight of the mirror, exacerbated by the presence of the reaction mass, has resulted in lighter and thinner mirrors to the point where they are extremely fragile and difficult to fabricate and process. Another problem is the varying performance of the different types of actuators. Surface normal actuators (SNA) of the displacement type afford good correctability but poorer excursion with high natural frequency and high areal density. SNA's of the force type are moderately good at correctability and high excursion, have lower level natural frequency and a moderate areal density. So called edge or radius of curvature actuators which generally just bend the mirror globally have high excursion but low correctability, a moderate natural frequency and low areal density. SNA's of the displacement type can be smaller and so can be packed more densely but they have limited capability displacement which places them at a disadvantage for effecting excursion or radius of curvature adjustments. SNA's of the force type have a better displacement range but cannot be packed too densely and so they cannot effect the best correctability. The edge or radius of curvature actuators simply bend the mirror about its center using a limited number of edge actuators and so are limited in their application for correctability. One shortcoming of all of these approaches is that they require a reaction mass which increases the size and weight of the mirror. Another is that the actuators are not easily installed or replaced. Further, since the optical substrate is typically glass or beryllium and the reaction mass is graphite composite there is a thermal mismatch which introduces its own distortion.

BRIEF SUMMARY OF THE INVENTION

It is therefore an object of this invention to provide an improved integrated actuator meniscus mirror.

It is a further object of this invention to provide such an improved integrated actuator meniscus mirror which requires no reaction mass.

It is a further object of this invention to provide such an improved integrated actuator meniscus mirror which performs well for both correctability and excursion.

It is a further object of this invention to provide such an improved integrated actuator meniscus mirror which has a higher natural frequency and lower areal density.

It is a further object of this invention to provide such an improved integrated actuator meniscus mirror whose actuators are embedded in the optical substrate of the mirror not only obviating the necessity for a reaction mass but making installation and replacement of the actuators much simpler.

It is a further object of this invention to provide such an improved integrated actuator meniscus mirror which enables added material to be used in the optical substrate of the mirror where it can improve its strength and rigidity and its suitability for manufacturing since the weight of the reaction mass has been eliminated.

This invention results from the realization that a truly improved, light weight, integrated actuator meniscus mirror requiring no reaction mass yet having good natural frequency, areal density, excursion, and correctability characteristics can be achieved with an optical substrate including a mirror surface on one side and a support structure on the other and a plurality of actuators embedded in the support structure spaced from and generally parallel to the mirror surface for controllably altering the shape of the mirror surface locally and globally, zonally or modally and further to do so without the need for a reaction mass.

This invention features an integrated actuator meniscus mirror including an optical substrate having a mirror surface on one side and a support structure on the other. A plurality of actuators are embedded in the support structure spaced from and generally parallel to the mirror surface for applying bending moments to the mirror surface for controllably altering the shape of the mirror surface.

In a preferred embodiment the optical substrate may include silicon carbide. The support structure may include an array of intersecting major ribs. Each actuator may be mounted in a major rib between the intersections. The support structure may include cathedral ribs on the back side of the mirror surface. Each rib may contain a recess for receiving an actuator. An actuator may include an electrostrictive device. Each actuator may include a lead-magnesium niobate electrostrictive device. The support structure may include an array of spaced posts and each actuator may extend between a pair of spaced posts. The bending movements are developed without resort to a reaction mass. The substrate may be formed of any type of optical material and the actuators may be any type of voltage controlled actuators.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
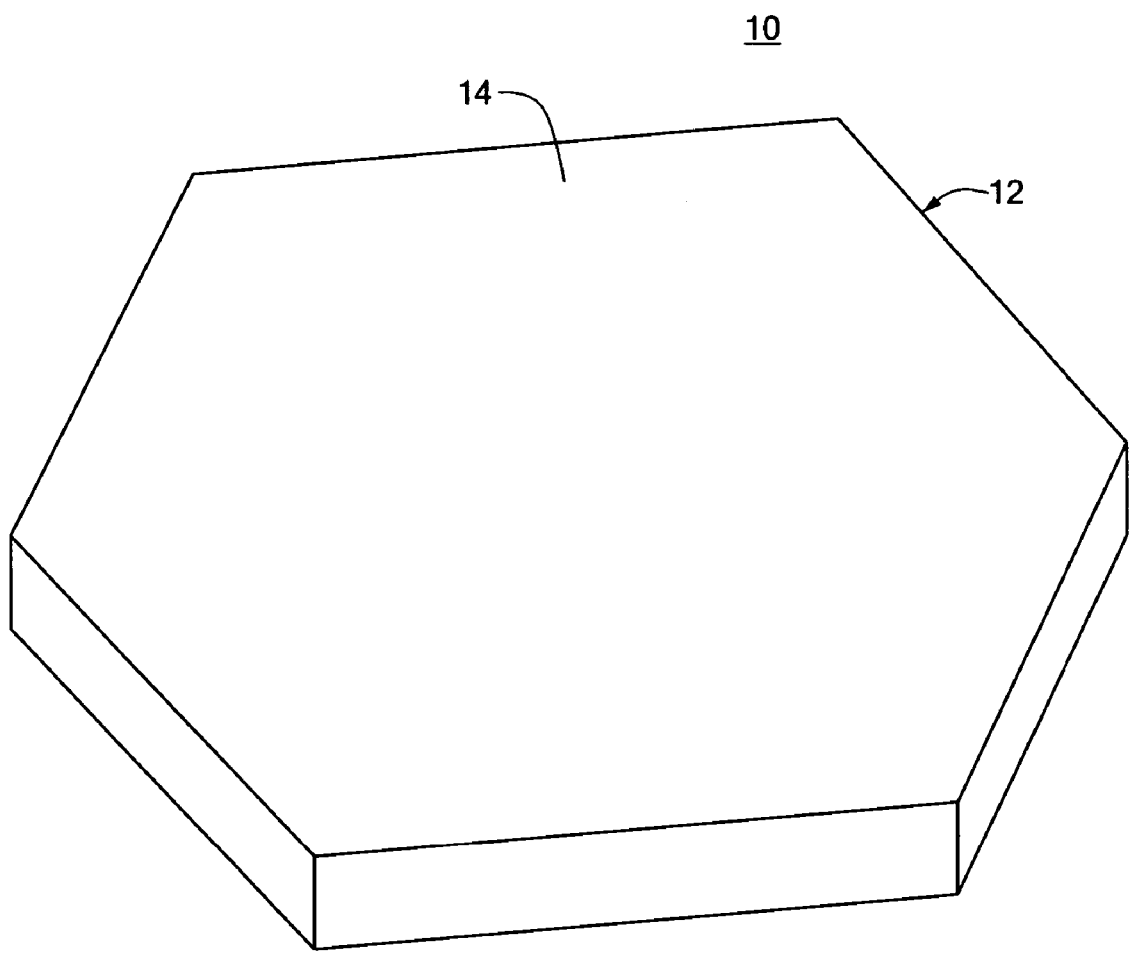
FIG. 1 is a three dimensional diagrammatic view of the mirror surface of the optical substrate of the integrated actuator meniscus mirror according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
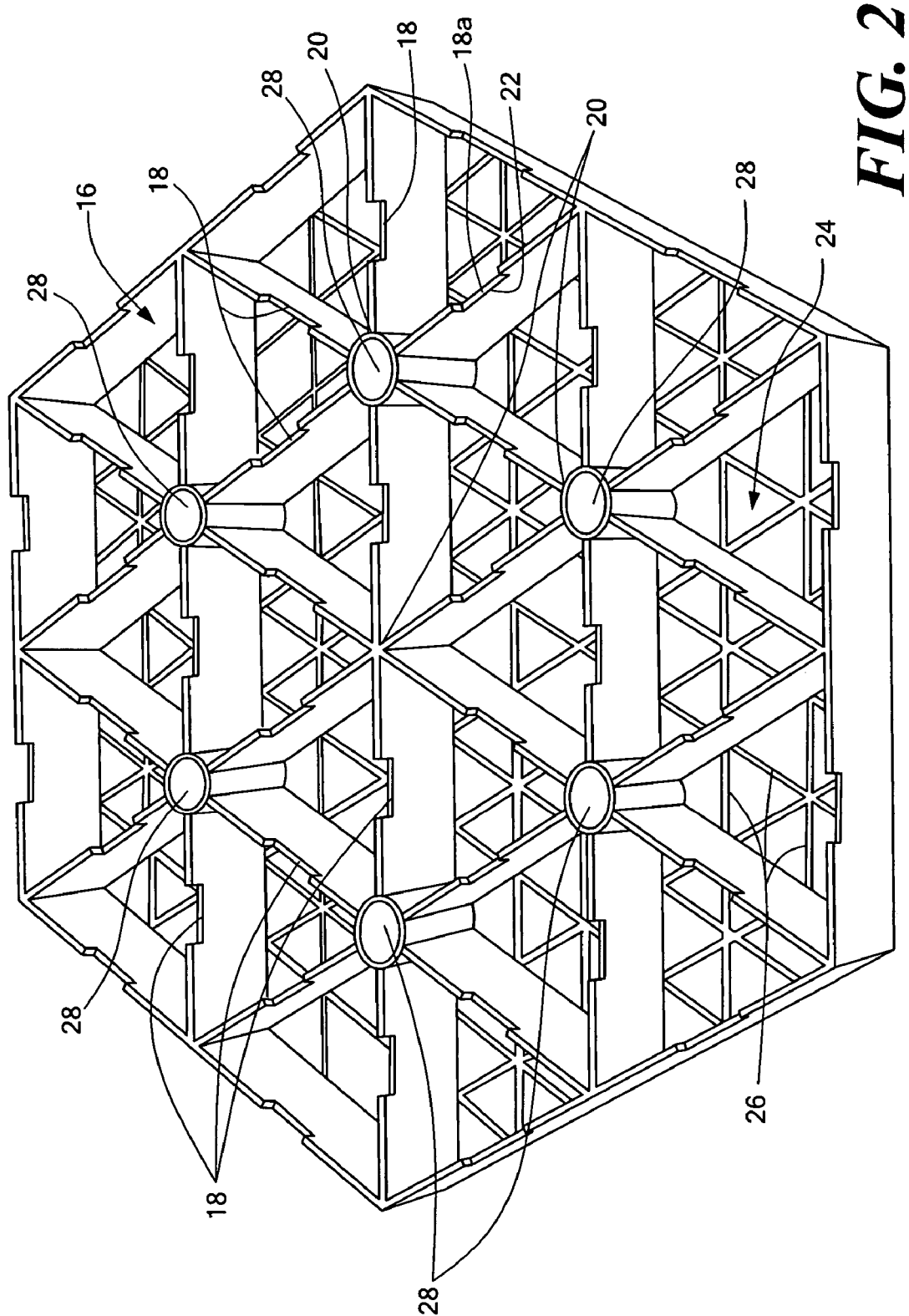
FIG. 2 is a three dimensional view of the other side of the optical substrate of FIG. 1 showing the support structure and underside of the mirror surface.

This invention features integrated actuator meniscus mirror 10, FIG. 1, including an optical substrate 12, typically silicon carbide or an equivalent, including an optical such as metal glass, ceramic, polymer and components thereof including but not limited to a Fused Silica, ULE, Zerodur, Al 6061-T6, MMC 30% SiC, Be I-70. Be I-220-H, Cu OFC, Cu Glidcop, Invar 36, Super Invar, Molybdenum, Silicon, SiC HP alpha, SiC CVD beta SoC RB 30% Si, C/SiC, SS 304, SS 416, SS 17-4PH, Ti 6A14V, Gr/EP GY70x30, having mirror surface 14 on one side and support structure 16, FIG. 2, on the other side. The support structure may include a plurality of major ribs 18, which intersect at a node 20 at the center of a zone of influence. Each major rib, such as rib 18a, includes recess or notch 22 in which an actuator may be located. The array of major ribs creates a honeycomb-like structure supporting back side 24 of the mirror surface on which can be located cathedral ribs 26 for strengthening and further supporting mirror surface 14. The six holes 28 which coincided with particular nodes 20 are not germane to this invention but are used to receive three pairs of bipods which connect to a mounting plate and form a part of the metering structure that supports the primary and secondary mirrors and additional equipment which, for example, make up a telescope or beam director.

Figure 3:
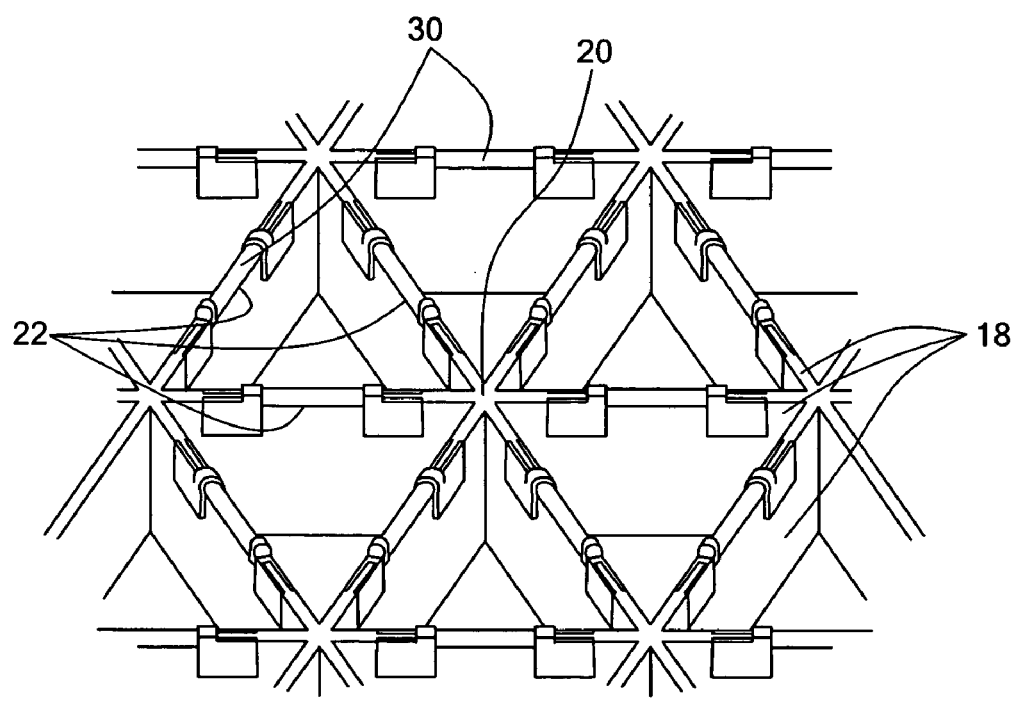
FIG. 3 is an enlarged three dimensional view of a portion of the support structure of FIG. 2 with actuators installed.

Actuators 30, FIG. 3, are embedded in recesses 22 of ribs 18 generally parallel to the mirror surface and spaced from it. When operated either by extension or contraction, actuators 30 apply bending moments to alter the shape of the mirror, both locally for correctability, and globally to effect radius of curvature alterations. Because actuators 30 act directly on the support structure in which they are embedded, they require no reaction mass. In addition, even though they may be displacement devices, they can perform a very effective radius of curvature or excursion shape alteration because their effect is cumulative.

Figure 4:
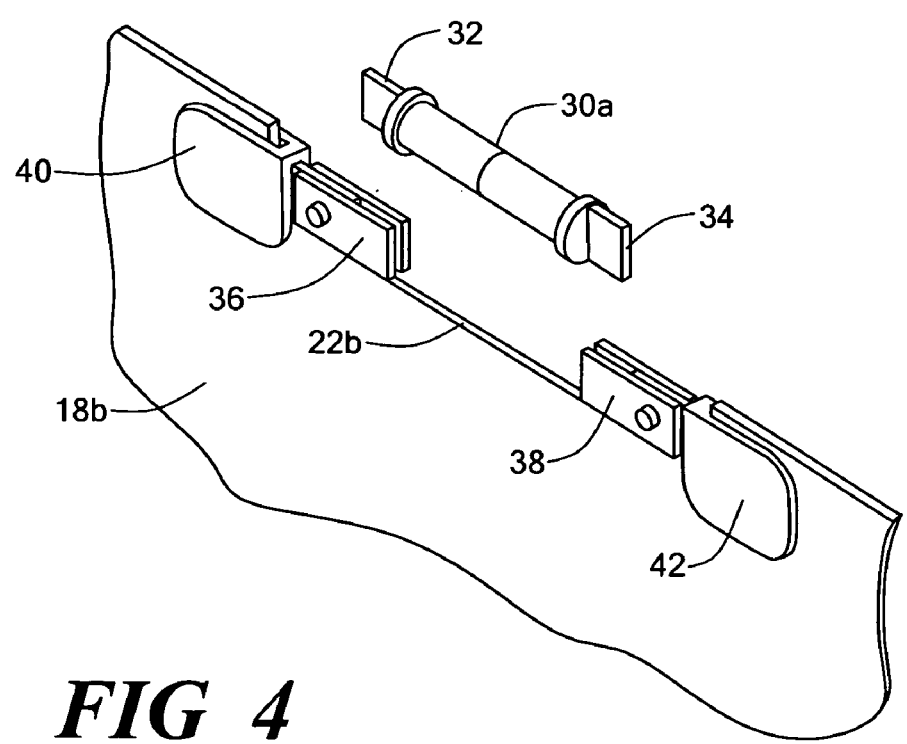
FIG. 4 is an enlarged three dimensional view of an actuator and actuator mounting.

Each of the actuators 30 may be an electrostrictive device or a magnetostrictive device, a piezoelectric device or any other suitable type of actuator such as hydraulic, voice coil, solenoid, mechanical or phase change material such as shape memory alloys or paraffin. In this preferred embodiment, they are illustrated as electrostrictive devices of the lead-magnesium niobate or PMN type which are preferred because they have a low thermal coefficient and very little hysteresis and creep and are dimensionally stable to sub-Angstrom levels. The actuators are characteristically easy to install and replace. For example, actuator 30a, FIG. 4, may contain mounting tabs 32 and 34 which are receivable in mounting clips 36 and 38 mounted in notch 22b of rib 18b. Slots 36 and 38 may be mounted to rib 18b by means of clamps 40 and 42. All of the interfaces may be supplied with an adhesive to permanently bond actuator 30a in position. The actuators may be ambient temperature actuators or cryogenic actuators so that the mirror can be converted from one type of operation to another quite easily by simply removing one type and replacing it with the other.

Figure 5:
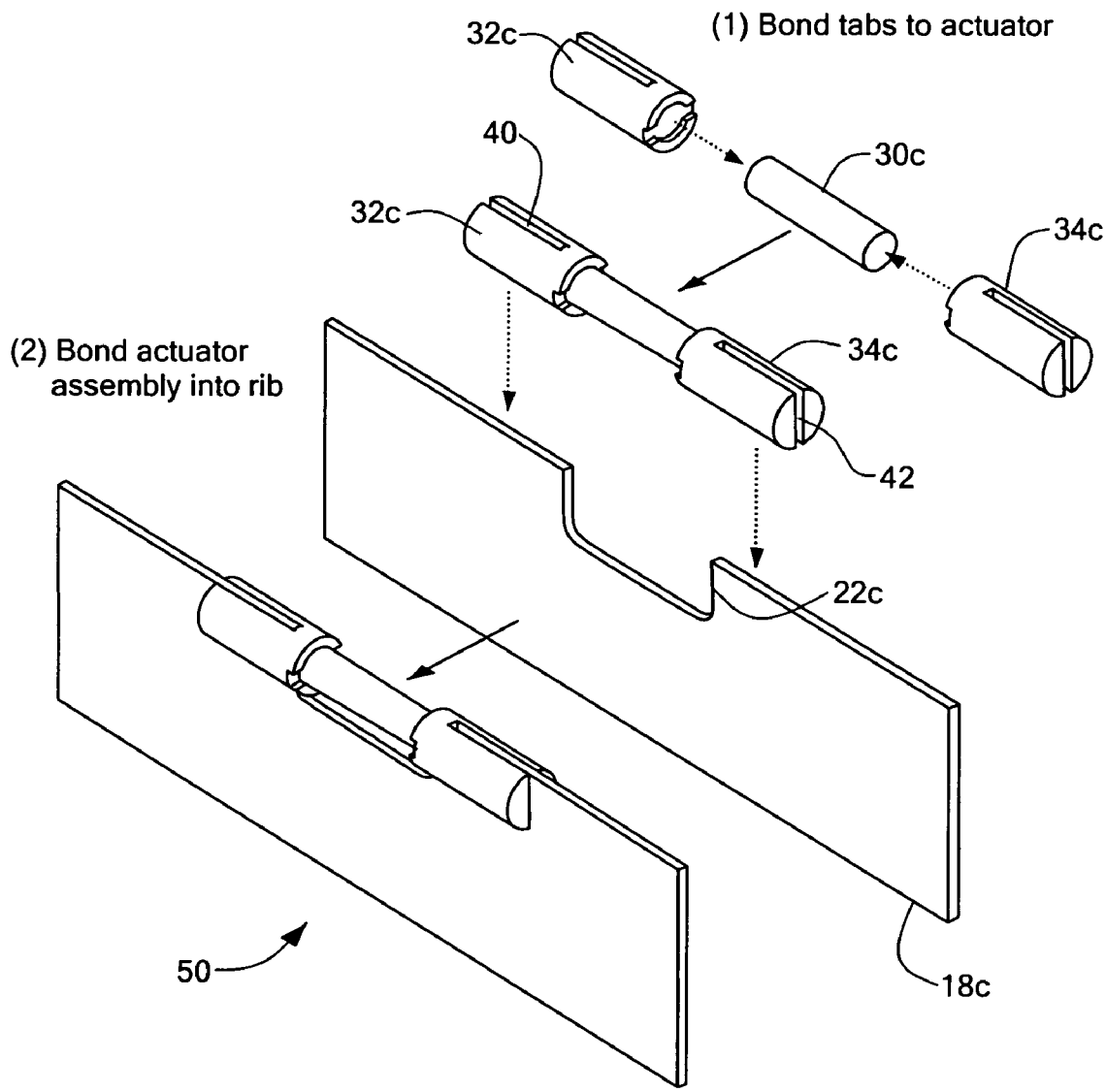
FIG. 5 is an enlarged three dimensional view of another actuator and actuator mounting implementation.

Another type of actuator mounting is shown in FIG. 5 where a three step installation is shown beginning with the actuator 30c being supplied with bonding tabs 32c and 34c which may be glued to it. This assembly is then installed in recess 22c of major rib 18c by engaging the slots 40 and 42 in tabs 32c and 34c with the edges of recess 22c so that the final assembly appears as at 50 in FIG. 5. Again, some or all of the engagements may have an adhesive applied to bond the components.

Figure 6:
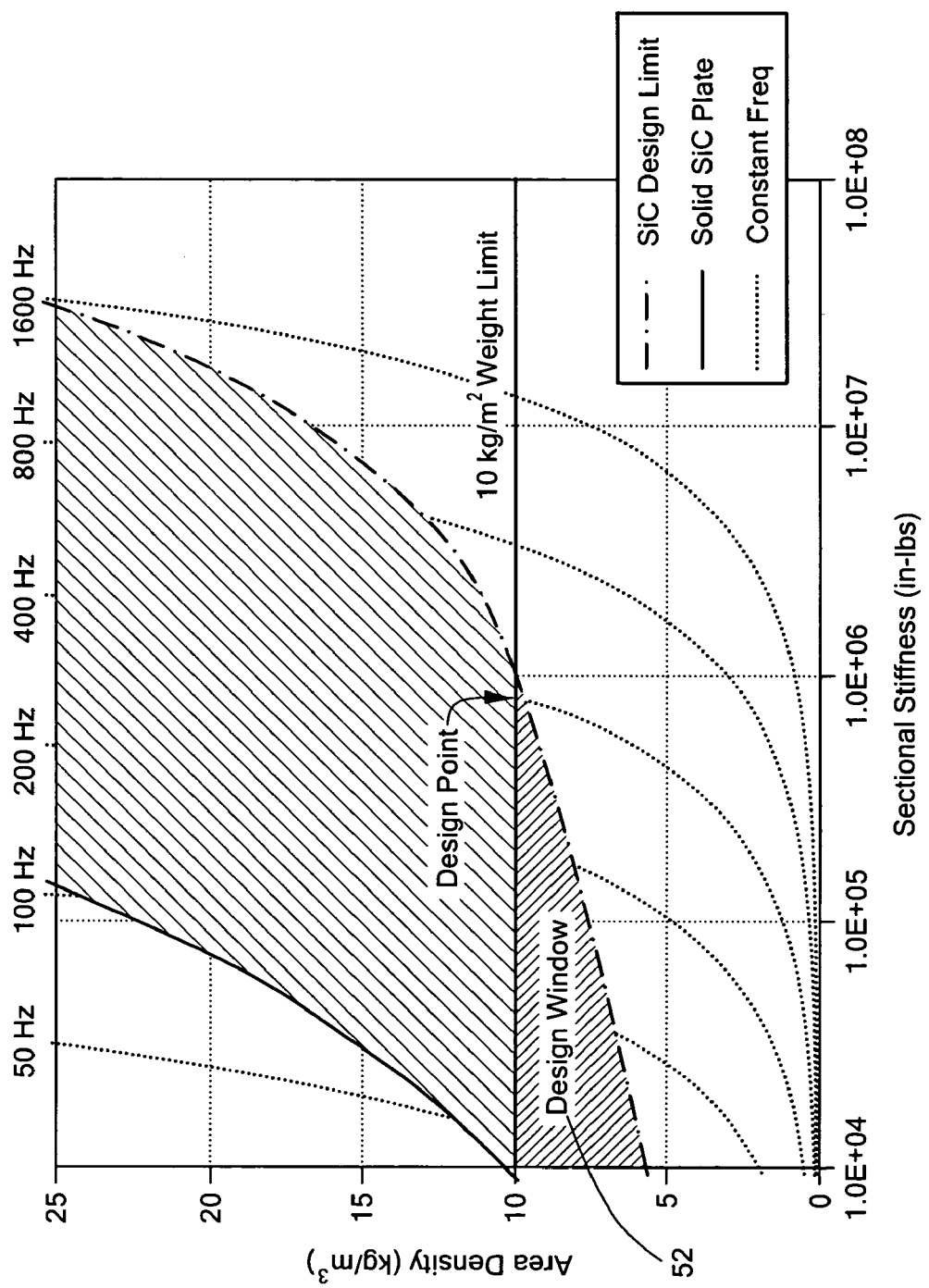
FIGS. 6, 7, and 8 are graphs illustrating the factors effecting stiffness, excursion and correctability, respectively.
Figure 7:
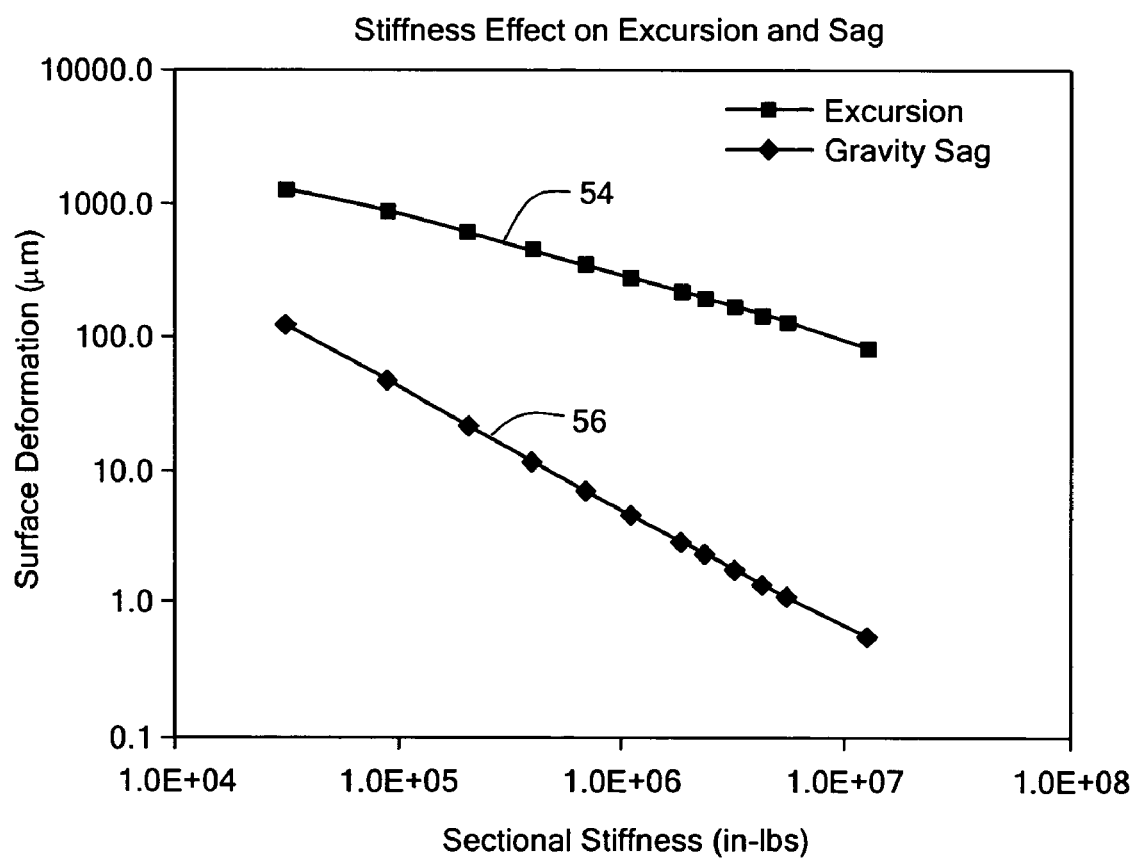
Figure 8:
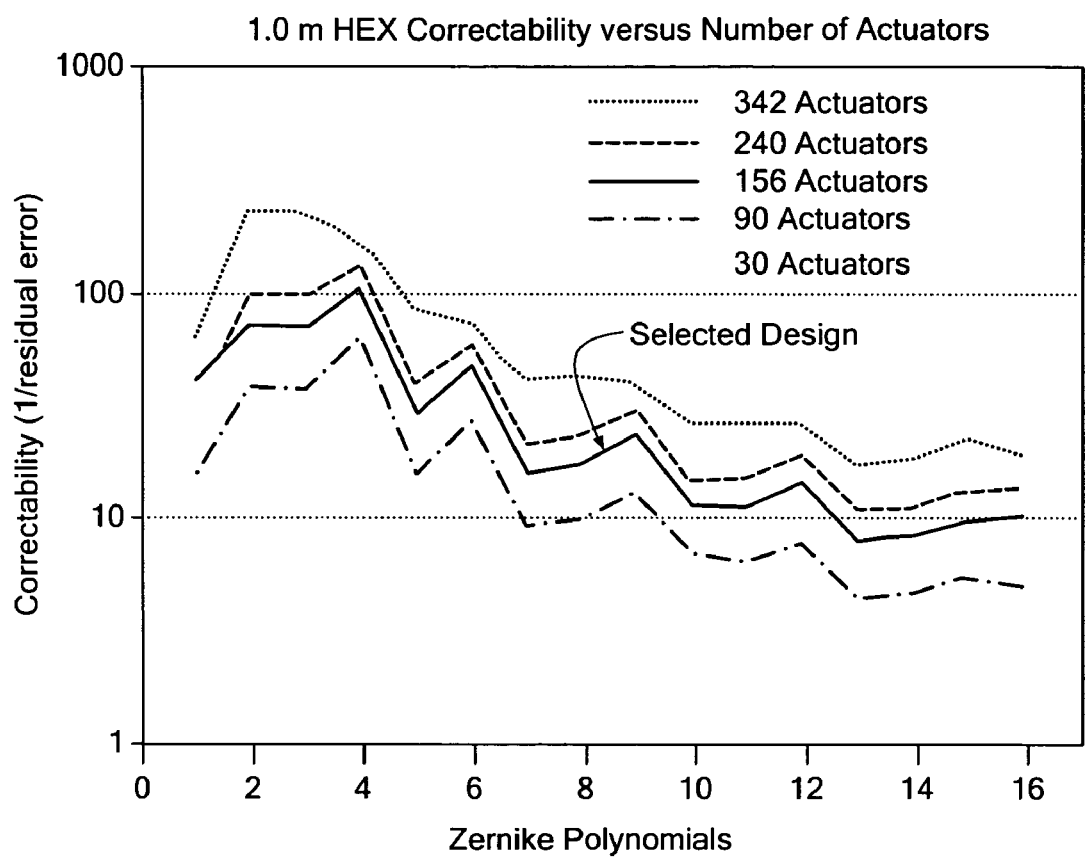

The efficacy of this invention is illustrated in FIGS. 6, 7, and 8. In FIG. 6 the trade-offs with respect to stiffness are displayed where it can be seen that for a design window 52, FIG. 6, defining an areal density of 10 $kg/m^2$ or less, a high stiffness of 1.0E+06 inch pounds can be achieved in conjunction with that low areal density while maintaining a fairly high 300 Hz natural frequency. FIG. 7 illustrates the trade-offs with respect to excursion where the surface deformation associated with excursion and gravity sag are both in satisfactory ranges expressed in sectional stiffness in inch pounds. The trade-off with respect to correctability is demonstrated in FIG. 8 where the correctability is plotted against Zernike polynomials indicating that the localized correction or correctability performs quite well even at high Zernike polynomials with adequate numbers of actuators. And adequate numbers of actuators is not a problem as they are small, lightweight, and can be highly densely packed.

Figure 9:
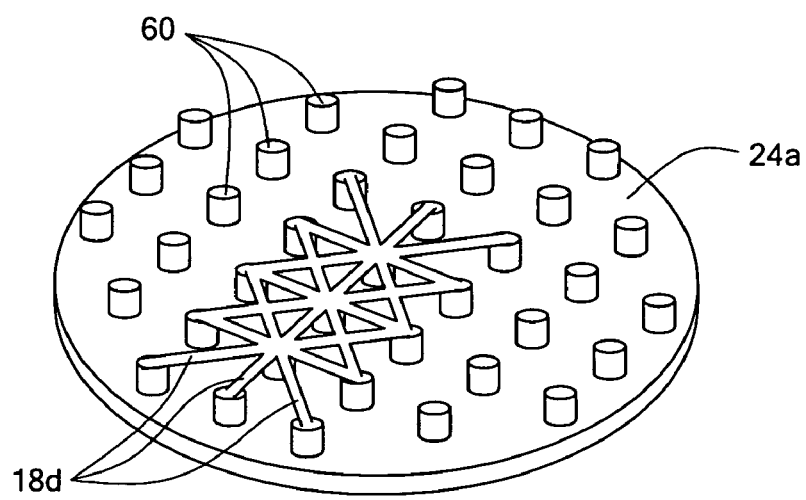
FIG. 9 is a three dimensional view of another support structure according to this invention.

Although the support structure shown is a honeycomb like structure formed from the intersecting ribs, this is not a necessary limitation of the invention as any structure which enables the actuators to be spaced from and generally parallel to the mirror surface may be used. For example, in FIG. 9 the support structure on back surface 24a of the mirror constitutes spaced bumps or dimples or posts 60 and the actuators 18d are connected between pairs of posts effecting the bending moments and creating the nodes as previously explained with respect to the honeycomb structure.

Figure 10:
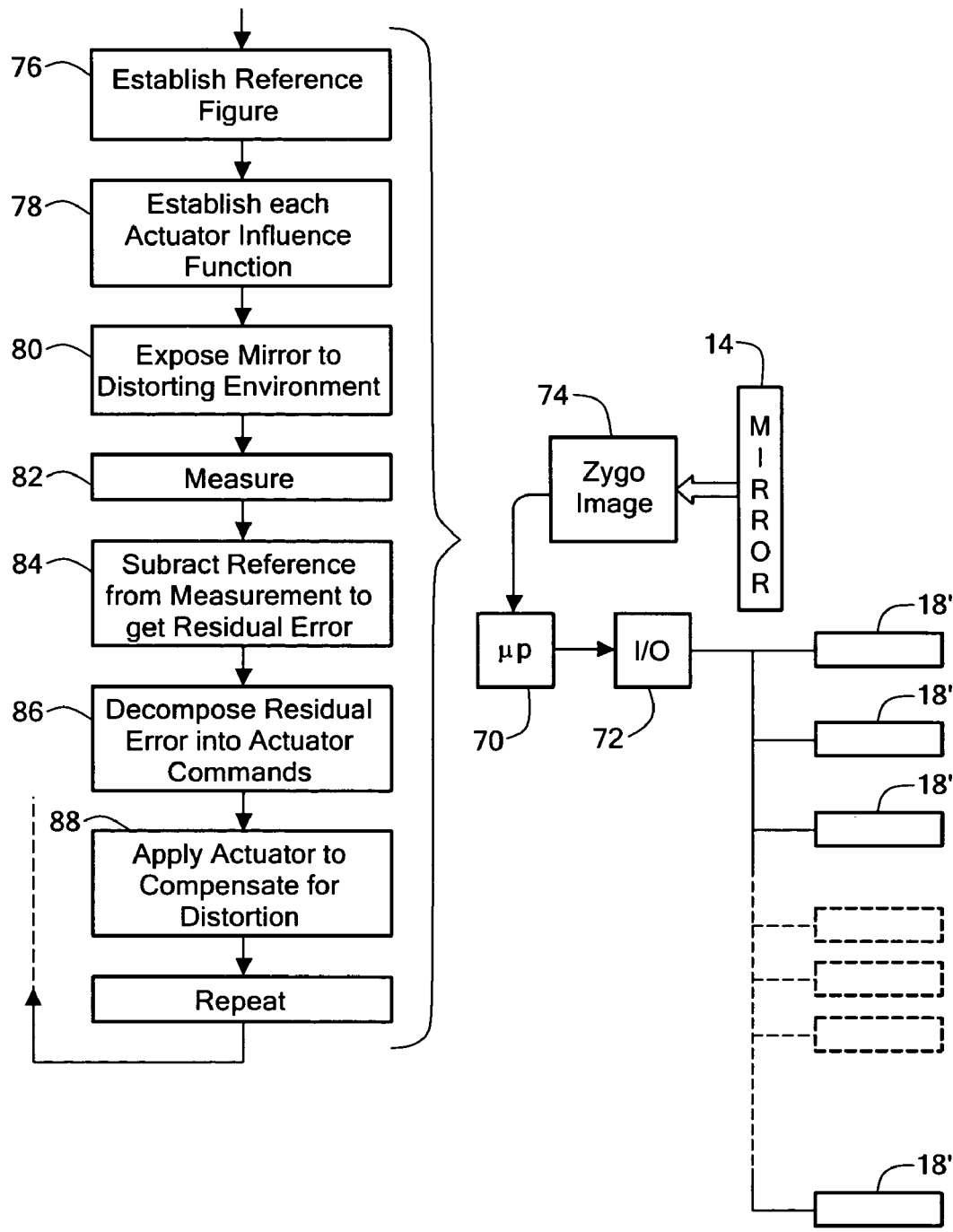
FIG. 10 is a diagram showing the method embodied in software in a microprocessor for driving the actuator to manipulate the shape of the mirror.

Any suitable hardware or software system may be used to monitor and feedback control signals to the integrated actuator meniscus mirror according to this invention. One such system is illustrated in FIG. 10 by way of example and not limitation. There microprocessor 70 drives I/O device 72 to provide voltages to actuators 30'. The zygo image 74 is generated from mirror surface 14, FIG. 10. Microprocessor 70 is configured with software to establish a reference FIG. 76 and then establish for each actuator an influence function on its associated nodes or zones 78. The mirror is then exposed to a distorting environment 80 and once again measured in step 82. The reference is then subtracted from the measurement to get residual error 84 and the residual error is decomposed 86 into actuator commands which are then applied to actuator 88 through 110 device 72 to provide the proper voltages to actuators 30'. This routine is carried out repeatedly in order to keep the mirror at the optimum shape. Although the preferred embodiment discussed above is generally of the zonal type the integrated actuator meniscus mirror of this inventor may be implemented as a model type or any other type.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An integrated actuator meniscus mirror comprising:
   an optical substrate including a mirror surface on one side and a support structure on the other side, the support structure including an array of intersecting major ribs wherein at least a plurality of said major ribs meet and cross each other; and
   a plurality of actuators each mounted in each one of said major ribs spaced from and generally parallel to said mirror surface for applying bending moments to said mirror surface for controllably altering the shape of said mirror surface.

2. The integrated actuator meniscus mirror of claim 1 in which said optical substrate includes an optical material.

3. The integrated actuator meniscus mirror of claim 1 in which said optical substrate includes an optical material selected from the group consisting of metals, glasses, ceramics, polymers and composites thereof.

4. The integrated actuator meniscus mirror of claim 1 in which said optical substrate includes silicon carbide.

5. The integrated actuator meniscus mirror of claim 1 in which each said actuator is mounted in said major rib between the intersections.

6. The integrated actuator meniscus mirror of claim 5 in which each said rib contains a recess for receiving said actuator.

7. The integrated actuator meniscus mirror of claim 1 in which said support structure includes cathedral ribs on the back side thereof for supporting said mirror surface.

8. The integrated actuator meniscus mirror of claim 1 in which said actuator includes an electrostrictive device.

9. The integrated actuator meniscus mirror of claim 8 in which said actuator includes a lead magnesium niobate electrostrictive device.

10. The integrated actuator meniscus mirror of claim 1 in which said support structure includes an array of spaced posts.

11. The integrated actuator meniscus mirror of claim 10 in which each said actuator extends between a pair of said spaced posts.

12. An integrated actuator meniscus mirror comprising:
    an optical substrate including a mirror surface on one side and a support structure on the other side, the support structure including an array of intersecting major ribs each having a recess therein; and
    a plurality of actuators each mounted in said recess spaced from and generally parallel to said mirror surface for applying bending moments to said mirror surface for controllably altering the shape of said mirror surface.

13. An integrated actuator meniscus mirror comprising:
    an optical substrate including a mirror surface on one side and a support structure on the other side, the support structure including an array of intersecting major ribs and an array of spaced posts; and
    a plurality of actuators each mounted in one of said major ribs spaced from and generally parallel to said mirror surface for applying bending moments to said mirror surface for controllably altering the shape of said mirror surface.

14. The integrated actuator meniscus mirror of claim 13 in which each said actuator extends between a pair of said posts.

* * * * *